US011205195B2

(12) United States Patent
Okuno et al.

(10) Patent No.: US 11,205,195 B2
(45) Date of Patent: Dec. 21, 2021

(54) INFORMATION PROCESSING DEVICE, INFORMATION PROCESSING METHOD, AND INFORMATION PROCESSING PROGRAM

(71) Applicant: Rakuten Group, Inc., Tokyo (JP)

(72) Inventors: Kaishi Okuno, Tokyo (JP); Kiminari Homma, Tokyo (JP); Katsuhito Matsushima, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 814 days.

(21) Appl. No.: 14/778,649

(22) PCT Filed: Mar. 29, 2013

(86) PCT No.: PCT/JP2013/059562
§ 371 (c)(1),
(2) Date: Sep. 21, 2015

(87) PCT Pub. No.: WO2014/155683
PCT Pub. Date: Oct. 2, 2014

(65) Prior Publication Data
US 2016/0042397 A1 Feb. 11, 2016

(51) Int. Cl.
*G06F 16/535* (2019.01)
*G06Q 30/02* (2012.01)
(Continued)

(52) U.S. Cl.
CPC ....... *G06Q 30/0263* (2013.01); *G06F 16/248* (2019.01); *G06F 16/9535* (2019.01); *G06Q 30/02* (2013.01)

(58) Field of Classification Search
CPC .. G06Q 30/0263; G06Q 30/02; G06F 16/248; G06F 16/9535
See application file for complete search history.

(56) References Cited

U.S. PATENT DOCUMENTS

| 2011/0213655 A1* | 9/2011 | Henkin | G06Q 30/00 |
| | | | 705/14.49 |
| 2012/0166267 A1* | 6/2012 | Beatty | G06Q 30/0219 |
| | | | 705/14.21 |
| 2019/0213211 A1* | 7/2019 | Zhao | G06F 3/0485 |

FOREIGN PATENT DOCUMENTS

JP 2007-286833 A 11/2007

OTHER PUBLICATIONS

Christina Uhl, How Much Ad Viewability is Enough? The Effect of Display Ad Viewability on Advertising Effectiveness*, 2020, pp. 3-14 (Year: 2020).*

* cited by examiner

*Primary Examiner* — Abhishek Vyas
*Assistant Examiner* — Darnell A Pouncil
(74) *Attorney, Agent, or Firm* — Sughrue Mion, PLLC

(57) ABSTRACT

Provided are an information processing device, an information processing method, and an information processing program capable of determining advertisements according to the intention of a person registering an article as advertisements to be displayed on a page supplied from a web site. The information processing device specifies a commodity classification of a commodity and an attribute value of an attribute of a commodity belonging to the commodity classification, based on an article described on a web page, and decides an evaluation made by a page supervisor for the attribute value based on the article. Then, the information processing device selects commodities that belong to the specified commodity classification and satisfy a selection condition according to the decided evaluation, as display target candidates. From among the selected commodities, a commodity of which an advertisement is to be displayed in an advertisement display area of the web page is determined.

13 Claims, 9 Drawing Sheets

(51) Int. Cl.
*G06F 16/248* (2019.01)
*G06F 16/9535* (2019.01)

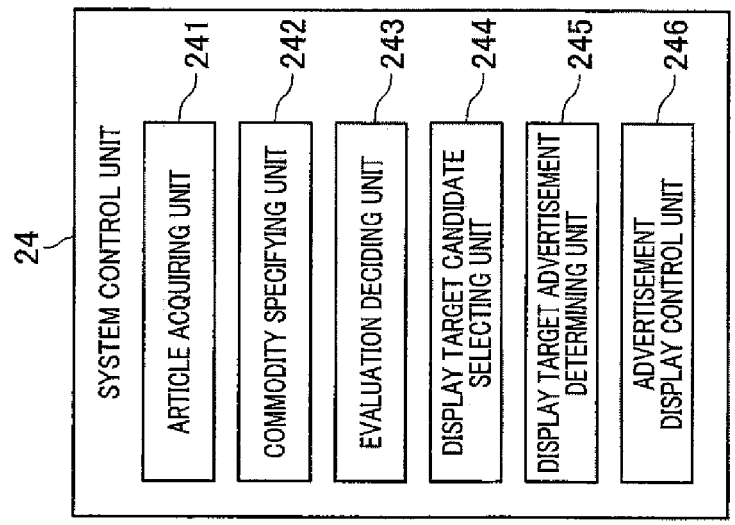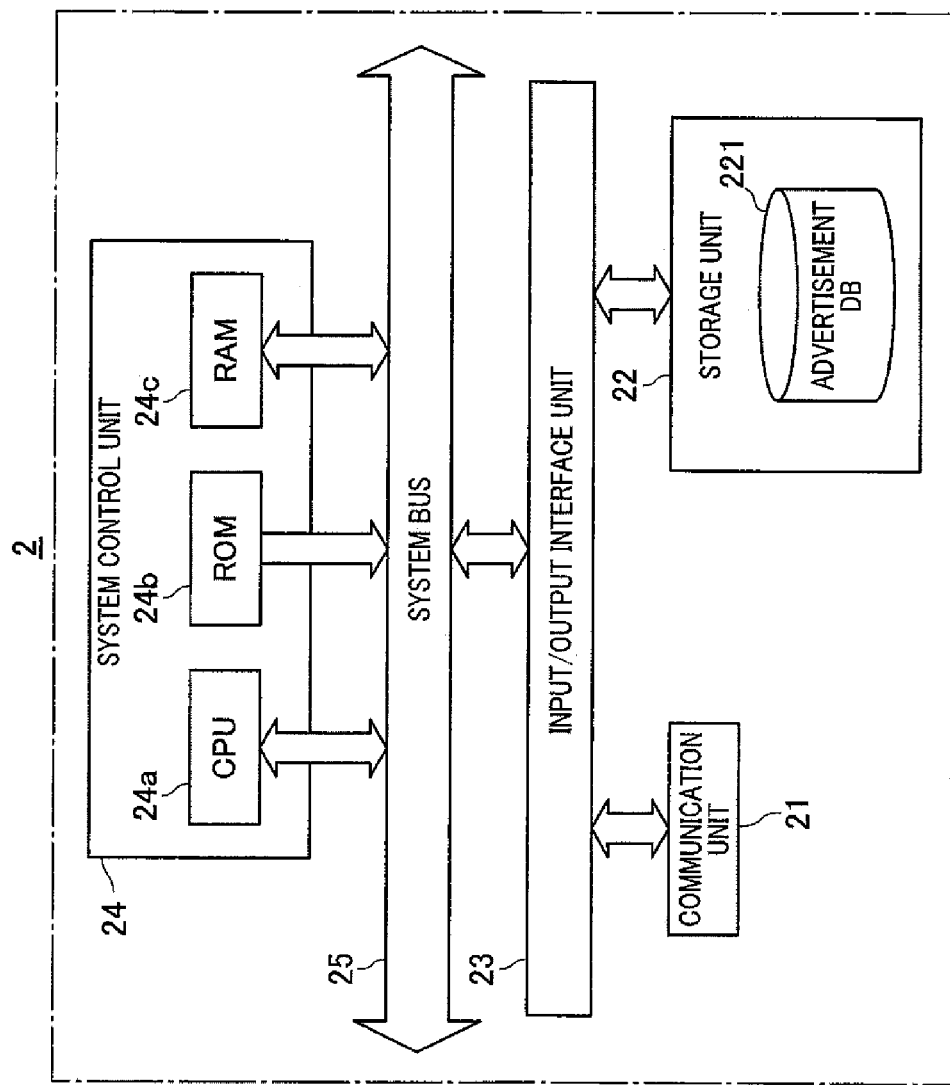

FIG.5A

| DISPLAY RANK | ADVERTISEMENT ID | COMMODITY ID | SCORE | ATTRIBUTE | | | |
|---|---|---|---|---|---|---|---|
| | | | | PIXELS | ZOOM | WEIGHT | PRICE RANGE |
| 1 | AD01 | C01 | 95 | EIGHT MILLION | TEN TIMES | 500g | ②: 20000~39999 |
| 2 | AD02 | S01 | 93 | EIGHT MILLION | EIGHT TIMES | 600g | ②: 20000~39999 |
| 3 | AD03 | C02 | 91 | TWELVE MILLION | TEN TIMES | 600g | ③: 40000~59999 |
| 4 | AD04 | N01 | 89 | TEN MILLION | TWELVE TIMES | 600g | ③: 40000~59999 |
| 5 | AD05 | N02 | 87 | FIFTEEN MILLION | TWENTY TIMES | 800g | ④: 60000~ |
| 6 | AD06 | N03 | 85 | TEN MILLION | TEN TIMES | 600g | ②: 20000~39999 |
| 7 | AD07 | K01 | 83 | FIVE MILLION | FIVE TIMES | 500g | ①: ~19999 |
| 8 | AD08 | S02 | 81 | FIFTEEN MILLION | TWENTY TIMES | 900g | ④: 60000~ |
| 9 | AD09 | N04 | 79 | TEN MILLION | TWELVE TIMES | 900g | ③: 40000~59999 |
| 10 | AD10 | S05 | 77 | EIGHT MILLION | EIGHT TIMES | 800g | ②: 20000~39999 |
| ≀ | | | | | | | |
| N | | | | | | | |

FIG.5B

| DISPLAY RANK | ADVERTISEMENT ID | COMMODITY ID | SCORE | ATTRIBUTE | | | | |
|---|---|---|---|---|---|---|---|---|
| | | | | PIXELS | ZOOM | WEIGHT | PRICE RANGE | |
| 1 | AD01 | C01 | 95 | EIGHT MILLION | TEN TIMES | 500g | ②: 20000~39999 | |
| 2 | AD02 | S01 | 93 | EIGHT MILLION | EIGHT TIMES | 600g | ②: 20000~39999 | |
| 3 | AD03 | C02 | 91 | TWELVE MILLION | TEN TIMES | 600g | ③: 40000~59999 | ←SELECTION |
| 4 | AD04 | N01 | 89 | TEN MILLION | TWELVE TIMES | 600g | ③: 40000~59999 | ←SELECTION |
| 5 | AD05 | N02 | 87 | FIFTEEN MILLION | TWENTY TIMES | 800g | ④: 60000~ | ←SELECTION |
| 6 | AD06 | N03 | 85 | TEN MILLION | TEN TIMES | 600g | ②: 20000~39999 | |
| 7 | AD07 | K01 | 83 | FIVE MILLION | FIVE TIMES | 500g | ①: ~19999 | |
| 8 | AD08 | S02 | 81 | FIFTEEN MILLION | TWENTY TIMES | 900g | ④: 60000~ | ←SELECTION |
| 9 | AD09 | N04 | 79 | TEN MILLION | TWELVE TIMES | 900g | ③: 40000~59999 | ←SELECTION |
| 10 | AD10 | S05 | 77 | EIGHT MILLION | EIGHT TIMES | 800g | ②: 20000~39999 | |
| ≀ | | | | | | | | |
| N | | | | | | | | |

FIG.6

| DISPLAY RANK | ADVERTISEMENT ID | COMMODITY ID | SCORE | ATTRIBUTE | | | |
|---|---|---|---|---|---|---|---|
| | | | | PIXELS | ZOOM | WEIGHT | PRICE RANGE |
| 2 | AD01 | C01 | 95 | EIGHT MILLION | TEN TIMES | 500g | ② : 20000~39999 |
| 3 | AD02 | S01 | 93 | EIGHT MILLION | EIGHT TIMES | 600g | ② : 20000~39999 |
| 5 | AD03 | C02 | 91 | TWELVE MILLION | TEN TIMES | 600g | ③ : 40000~59999 |
| 1 | AD04 | N01 | 89 | TEN MILLION | TWELVE TIMES | 600g | ③ : 40000~59999 |
| | AD05 | N02 | 87 | FIFTEEN MILLION | TWENTY TIMES | 800g | ④ : 60000~ |
| | AD06 | N03 | 85 | TEN MILLION | TEN TIMES | 600g | ② : 20000~39999 |
| 6 | AD07 | K01 | 83 | FIVE MILLION | FIVE TIMES | 500g | ① : ~19999 |
| 4 | AD08 | S02 | 81 | FIFTEEN MILLION | TWENTY TIMES | 900g | ④ : 60000~ |
| | AD09 | N04 | 79 | TEN MILLION | TWELVE TIMES | 900g | ③ : 40000~59999 |
| | AD10 | S05 | 77 | EIGHT MILLION | EIGHT TIMES | 800g | ② : 20000~39999 |
| ⋮ | | | | | | | |
| N | | | | | | | |

FIG.7

| DISPLAY RANK | ADVERTISEMENT ID | COMMODITY ID | SCORE | ATTRIBUTE | | | | DISTANCE | | | |
| --- | --- | --- | --- | --- | --- | --- | --- | --- | --- | --- | --- |
| | | | | PIXELS | ZOOM | WEIGHT | PRICE RANGE | ZOOM | WEIGHT | PRICE RANGE | TOTAL |
| 2 | AD01 | C01 | 95 | EIGHT MILLION | TEN TIMES | 500g | ②:20000~39999 | | | | |
| 3 | AD02 | S01 | 93 | EIGHT MILLION | EIGHT TIMES | 600g | ②:20000~39999 | | | | |
| | AD03 | C02 | 91 | TWELVE MILLION | TEN TIMES | 600g | ③:40000~59999 | 0 | | 1 | 2 |
| | AD04 | N01 | 89 | TEN MILLION | TWELVE TIMES | 600g | ③:40000~59999 | 1 | 1 | 1 | 3 |
| | AD05 | N02 | 87 | FIFTEEN MILLION | TWENTY TIMES | 800g | ④:60000~ | 3 | 2 | 2 | 7 |
| 1 | AD06 | N03 | 85 | TEN MILLION | TEN TIMES | 600g | ②:20000~39999 | 0 | 1 | 0 | 1 |
| | AD07 | K01 | 83 | FIVE MILLION | FIVE TIMES | 500g | ①:~19999 | | | | |
| 6 | AD08 | S02 | 81 | FIFTEEN MILLION | TWENTY TIMES | 900g | ④:60000~ | 3 | 3 | 2 | 8 |
| 4 | AD09 | N04 | 79 | TEN MILLION | TWELVE TIMES | 900g | ③:40000~59999 | 1 | 3 | 1 | 5 |
| | AD10 | S05 | 77 | EIGHT MILLION | EIGHT TIMES | 800g | ②:20000~39999 | | | | |
| ⋮ | | | | | | | | | | | |
| N | | | | | | | | | | | |

INFORMATION PROCESSING DEVICE, INFORMATION PROCESSING METHOD, AND INFORMATION PROCESSING PROGRAM

CROSS REFERENCE TO RELATED APPLICATIONS

This application is a National Stage of International Application No. PCT/JP2013/059562 filed Mar. 29, 2013, the contents of all of which are incorporated herein by reference in their entirety.

TECHNICAL FIELD

The present invention relates to a technical field of a system capable of providing an advertisement associated with a content of an article registered in a web site to a user and the like.

BACKGROUND ART

Conventionally, an advertisement distribution system capable of providing an advertisement associated with a content of an article (content) registered in a web site has been known (for example, Patent Literature 1). In such a system, a keyword or a topic is extracted from an advertisement placement target content of a web site in which an advertisement is placed, and, in a case where an access to the advertisement placement target content is requested by a reader from a terminal, a search for an advertisement is executed using the keyword or the topic that has been extracted, and a content to which an advertisement is attached is provided for the reader's terminal. In this way, the reader can acquire an advertisement relating to an accessed content.

CITATION LIST

Patent Literature

Patent Literature 1: JP 2007-286833 A

SUMMARY OF THE INVENTION

Problem to be Solved by the Invention

However, according to the conventional technology as described above, in a case where a web site in which an article is registered (posted) is assigned to each of a plurality of users, an advertisement according to the intention of a registering person (poster) who has registered an article in a web site assigned to him is not necessarily selected. For this reason, it is difficult to cause a reader to read an advertisement according to the intention of a registering person who has registered an article in a web site that is assigned to him.

The present invention is devised in consideration of the above-described points and the like, and an object thereof is to provide an information processing device, an information processing method, and an information processing program capable of determining advertisements according to the intention of a person registering an article as advertisements to be displayed on a page supplied from a web site.

Means for Solving the Problem

In order to solve the above problem, the invention of clause 1 is an information processing device comprising:

an acquiring means that acquires an article on a page being displayed on a display screen of a terminal device, wherein an article display area used for displaying the article registered by a supervisor supervising the page and an advertisement display area used for displaying an advertisement of a commodity are arranged in the page;

a specifying means that specifies a commodity classification of a commodity and an attribute value of an attribute of a commodity belonging to the commodity classification based on the acquired article;

a deciding means that decides an evaluation made by the supervisor for the specified attribute value based on the acquired article; and a determining means that determines a commodity which belongs to the specified commodity classification and of which the attribute value of the attribute satisfies a condition according to the decided evaluation, as a commodity of which an advertisement is to be displayed in the advertisement display area of the page, from among commodities corresponding to commodity information stored in a storing means that stores the commodity information of each of a plurality of commodities.

According to this invention, an advertisement according to the intention of a person registering an article (a supervisor of a page) can be determined as an advertisement to be displayed on the page.

The invention of clause 2 is the information processing device according to clause 1, wherein the specifying means acquires commodity specifying information of the commodity and the attribute of the commodity from the article, and specifies the commodity classification stored in the storing means in association with the acquired commodity specifying information, and the attribute value that is the attribute value of the acquired attribute and is stored in the storing means in association with the commodity specifying information.

According to this invention, even in a case where a commodity classification and an attribute value of an attribute of a commodity are not included in the article, the commodity classification and the attribute value of the attribute can be specified based on the commodity specifying information and the attribute of the commodity.

The invention of clause 3 is the information processing device according to clause 1 or 2, wherein the specifying means further specifies an attribute value of another attribute other than the attribute value specified by the specifying means, that is stored in the storing means in association with the commodity specifying information of the commodity acquired from the article, and the determining means determines a commodity that has an attribute value of another attribute having a difference of a threshold or less from the attribute value of the another attribute specified by the specifying means, with high priority as a commodity of which the advertisement is displayed.

According to this invention, an advertisement further according to the intention of a person registering an article (a supervisor of a page) can be determined as an advertisement to be displayed on the page.

The invention of clause 4 is the information processing device according to any one of clauses 1 to 3, wherein the determining means determines a commodity having the same attribute value as the attribute value specified by the specifying means, or an attribute value that is more advantageous than the attribute value specified by the specifying means with high priority, as a commodity of which the advertisement is to be displayed.

According to this invention, an advertisement further according to the intention of a person registering an article (a supervisor of a page) can be determined as an advertisement to be displayed on the page.

The invention of clause 5 is the information processing device according to clause 4, wherein, in a case where the evaluation decided by the deciding means is positive, the determining means determines a commodity having the same attribute value as the attribute value specified by the specifying means with high priority, as a commodity of which the advertisement is to be displayed.

According to this invention, an advertisement according to the intention of a person registering an article (a supervisor of a page) that is based on a positive representation can be determined as an advertisement to be displayed on the page.

The invention of clause 6 is the information processing device according to clause 4, wherein, in a case where the evaluation decided by the deciding means is negative, the determining means determines a commodity having an attribute value that is more advantageous than the attribute value specified by the specifying means with high priority, as a commodity of which the advertisement is to be displayed.

According to this invention, an advertisement according to the intention of a person registering an article (a supervisor of a page) that is based on a negative representation can be determined as an advertisement to be displayed on the page.

The invention of clause 7 is the information processing device according to any one of clauses 1 to 6, wherein a plurality of the article display areas each associated with registration date and time of each of the articles are arranged on the page, the specifying means specifies a commodity classification of a commodity and an attribute value of an attribute of a commodity belonging to the commodity classification, based on the article displayed in the article display area that is associated with latest registration date and time, and the deciding means decides an evaluation made by the supervisor for the attribute value specified by the specifying means, based on the article displayed in the article display area that is associated with the latest registration date and time.

According to this invention, an advertisement according to the latest intention of a person registering an article (a supervisor of a page) can be determined as an advertisement to be displayed on the page.

The invention of clause 8 is the information processing device according to any one of clauses 1 to 6, wherein a plurality of the article display areas that are switchable between an active state and an inactive state on the display screen are arranged on the page, the specifying means specifies a commodity classification of a commodity and an attribute value of an attribute of a commodity belonging to the commodity classification, based on the article displayed in the article display area that is in the active state, and the deciding means decides an evaluation made by the supervisor for the attribute value specified by the specifying means, based on the article displayed in the article display area that is in the active state.

According to this invention, an advertisement that is according to the intention of a person registering an article (a supervisor of a page) and an article currently read by a reader can be determined as an advertisement to be displayed on a web page.

The invention of clause 9 is the information processing device according to clause 8, wherein the advertisement display area that is fixedly displayed on the display screen and the article display area that is displayed to be movable on the display screen are arranged on the page, the information processing device further comprises a controlling means that switches the advertisement displayed in the advertisement display area to the terminal device in accordance with movement of the article display area.

According to this invention, an appropriate advertisement can be displayed following reader's reading accompanying scrolling.

The invention of clause 10 is the information processing device according to clause 9, wherein the controlling means switches the advertisement displayed in the advertisement display area to the terminal device in accordance with a change in a display ratio of the article display area to the display screen.

According to this invention, an appropriate advertisement can be displayed following reader's reading accompanying scrolling.

The invention of clause 11 is the information processing device according to clause 9, wherein the controlling means switches the advertisement displayed in the advertisement display area to the terminal device in accordance with a change in a display ratio of the article display area that is in the active state to the entire article display area.

According to this invention, an appropriate advertisement can be displayed following reader's reading accompanying scrolling.

The invention of clause 12 is an information processing method executed by a computer, comprising:

an acquiring step of acquiring an article on a page being displayed on a display screen of a terminal device, wherein an article display area used for displaying the article registered by a supervisor supervising the page and an advertisement display area used for displaying an advertisement of a commodity are arranged in the page;

a specifying step of specifying a commodity classification of a commodity and an attribute value of an attribute of a commodity belonging to the commodity classification based on the acquired article;

a deciding step of deciding an evaluation made by the supervisor for the specified attribute value based on the acquired article; and a determining step of determining a commodity which belongs to the specified commodity classification and of which the attribute value of the attribute satisfies a condition according to the decided evaluation, as a commodity of which an advertisement is to be displayed in the advertisement display area of the page, from among commodities corresponding to commodity information stored in a storing means that stores the commodity information of each of a plurality of commodities.

The invention of clause 13 is an information processing program causing a computer to serve as:

an acquiring means that acquires an article on a page being displayed on a display screen of a terminal device, wherein an article display area used for displaying the article registered by a supervisor supervising the page and an advertisement display area used for displaying an advertisement of a commodity are arranged in the page;

a specifying means that specifies a commodity classification of a commodity and an attribute value of an attribute of a commodity belonging to the commodity classification based on the acquired article;

a deciding means that decides an evaluation made by the supervisor for the specified attribute value based on the acquired article; and a determining means that determines a commodity which belongs to the specified commodity classification and of which the attribute value of the attribute satisfies a condition according to the decided evaluation, as a commodity of which an advertisement is to be displayed in the advertisement display area of the page, from among commodities corresponding to commodity information stored in a storing means that stores the commodity information of each of a plurality of commodities.

Advantageous Effects of the Invention

According to this invention, an advertisement according to the intention of a person of registering an article (supervisor of a page) can be determined as an advertisement to be displayed on the page.

BRIEF DESCRIPTION OF THE DRAWINGS

FIG. 3A is a block diagram that illustrates an example of the schematic configuration of an advertisement processing server 2 according to this embodiment, and FIG. 3B is a diagram that illustrates an example of functional blocks of a system control unit 54.

FIG. 5A is a diagram that illustrates an example of a list of commodity information of commodities and the like acquired from an advertisement database 221 by a display target candidate selecting unit 244, and FIG. 5B is a diagram that illustrates display target candidates selected in a case where an evaluation is negative.

FIG. 6 is a diagram that illustrates the manner of rearrangement of display ranks of display target candidates.

FIG. 7 is a diagram that illustrates the manner of rearrangement of display ranks of display target candidates based on a total of distances according to differences of attribute values of a plurality of other attributes.

MODE FOR CARRYING OUT THE INVENTION

Hereinafter, an embodiment of the present invention will be described with reference to the drawings. The embodiment described below is an embodiment of a case where the present invention is applied to an information providing system.

1. Configuration and Outline Function of Information Providing System

Figure 1:
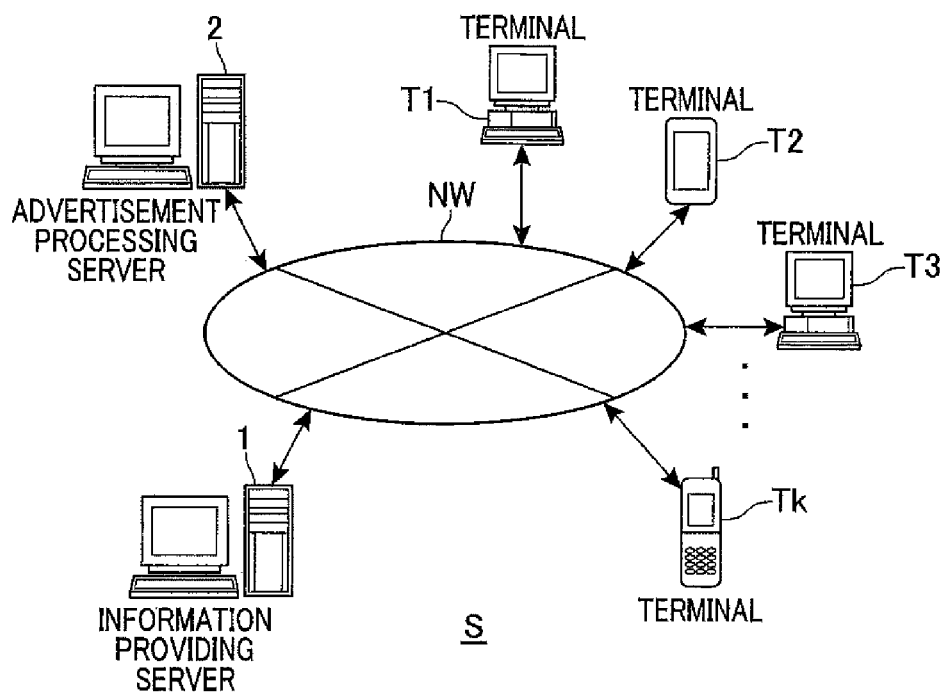
FIG. 1 is a diagram that illustrates an example of the schematic configuration of an information providing system S according to this embodiment.

First, the configuration and the outline function of an information providing system S according to this embodiment will be described with reference to FIG. 1. FIG. 1 is a diagram that illustrates an example of the schematic configuration of the information providing system S according to this embodiment. As illustrated in FIG. 1, the information providing system S is configured to include an information providing server 1, an advertisement processing server 2, and the like. The advertisement processing server 2 is an example of an information processing device according to the present invention. The information providing server 1 and the advertisement processing server 2 are connected to a network NW. The network NW, for example, is built by the Internet, a dedicated communication line (for example, a community antenna television (CATV) line), a mobile communication network (including a base station and the like), a gateway, and the like. In addition, terminals Tn (n=1, 2, 3, . . . , k) are connectable to the information providing server 1 and the advertisement processing server 2 through the network NW. Furthermore, as the terminals Tn, for example, terminal devices such as a personal computer (PC), a mobile phone, a personal digital assistant (PDA), a smartphone combining a mobile phone and a mobile information terminal, and a mobile game device can be used. In addition, as users using the terminals Tn, there are a page supervisor to be described later, a reader, an advertiser, and the like.

The information providing server 1 is a server that provides a web site such as a blog site or a social networking service (SNS) site. A web site is assigned to each of a plurality of users, and a unique uniform resource locator (URL) is assigned thereto. In a web site, an article that can be displayed on a web page provided for the terminal Tn is registered. The article, for example, is configured by text data. A user to whom a web site is assigned serves as a supervisor (hereinafter, referred to as a "page supervisor") supervising a web page provided from the web site. For example, an establisher (user) establishing a web site by executing predetermined procedures through a terminal Tn corresponds to the page supervisor. In addition, other than the establisher of a web site, for example, a user using a blog service that is provided by an operator of the blog site corresponds to the page supervisor. However, a web site that provides a web page including more articles registered by users other than a supervisor of a web page than articles registered by the supervisor of the web page such as a bulletin board is not the target for the application of the present invention.

A web page provided from the web site is configured by a structured document such as a hypertext markup language (HTML) document or an XHTML document, image data, and the like. By designating a URL of a web site using a web browser, the terminal Tn displays a web page provided from the web site on a display screen (window screen) represented on a display. Accordingly, a page supervisor of the web site or a reader other than the page supervisor of the web site can read information displayed on the web page. In such a web page, at least, an article display area used for displaying (describing) an article registered by the page supervisor of the web site and an advertisement display area used for displaying an advertisement of a commodity (item)

are arranged. Here, commodities refer to targets for transactions and include not only goods but also services and the like. In the services, various services such as a facility accommodation service and a use service are included. In the advertisement display area, a script for requesting the advertisement processing server 2 to distribute an advertisement, acquiring an advertisement (advertisement data) from the advertisement processing server 2, and embedding the advertisement in the advertisement display area is set. This script is configured using a predetermined script language (for example, JavaScript (registered trademark)) and is described inside a structured document configuring a web page. The advertisement provided from the advertisement processing server 2, for example, is configured by text data, image data, or the like. In addition, in the advertisement, a link (hyperlink) to a web site providing information of a commodity or a web site executing commodity order processing is set.

Figure 2:
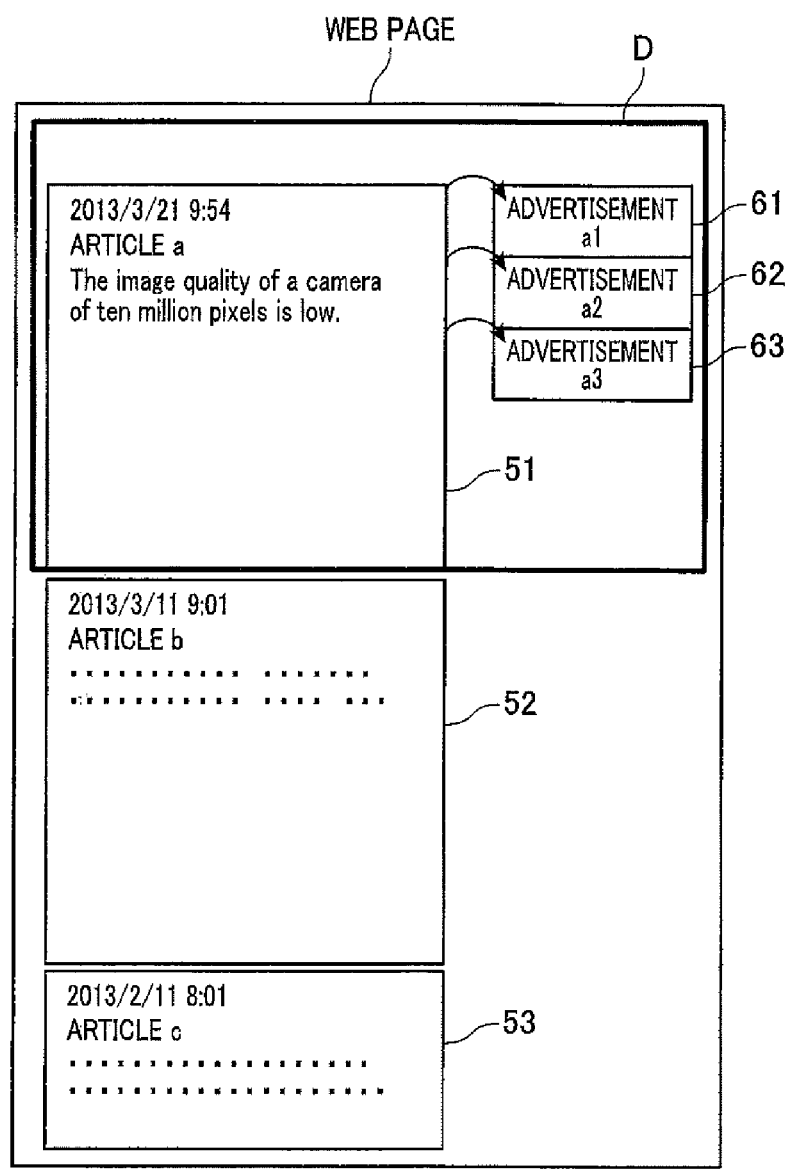
FIG. 2 is a diagram that illustrates an example of a web page on which article display areas and advertisement display areas are arranged.

FIG. 2 is a diagram that illustrates an example of a web page on which article display areas and advertisement display areas are arranged. In the example illustrated in FIG. 2, on the web page, a plurality of article display areas 51 to 53 and a plurality of advertisement display areas 61 to 63 are arranged. With each of the article display areas 51 to 53, registration date and time of an article displayed in the corresponding article display area is associated. As the registration date and time of an article is newer, the article is displayed in the article display area disposed on a further upper portion (a position displayed first) of the web page. More specifically, among articles a to c included in the web page illustrated in FIG. 2, the article a of which the registration date and time is the newest is displayed in the article display area 51 disposed in the uppermost portion of the web page. In addition, the article b of which the registration date and time is second newest is displayed in the article display area 52 disposed in a second uppermost portion of the web page, and the article c of which the registration date and time is third newest is displayed in the article display area 53 disposed in a third uppermost portion of the web page. In the example illustrated in FIG. 2, while the advertisement display areas 61 to 63 are adjacently arranged, the advertisement display areas 61 to 63 may be arranged at arbitrary display positions. In addition, as illustrated in FIG. 2, an area of the web page that cannot be completely fit into a display screen D of the terminal Tn is displayed on the display screen D as the screen is scrolled according to a scrolling operation executed by a registrant (page supervisor), a reader, or the like of the article. Accordingly, each of the article display areas 51 to 53 and the advertisement display areas 61 to 63 can be switched between an active state and an inactive state on the display screen D. Here, the active state represents a state of being displayed on the display screen D. An article display area that is in the active state can receive an article input by a registrant (page supervisor) of the article. Then, the article input by the registrant (page supervisor) of the article is registered in the web site providing the web page and is displayed in the article display area. In addition, the advertisement display area that is in the active state can receive a selection of an advertisement that is executed by the reader. In a case where an advertisement is selected by a reader, for example, a web page on which the information of a commodity is placed is displayed according to a link set in the selected advertisement. In addition, an area of the web page that cannot be completely fit into the inside of the display screen D of the terminal Tn may be configured to be acquired each time from the information providing server 1 according to a scrolling operation, for example, by using the technology of Ajax.

FIG. 3A is a block diagram that illustrates an example of the schematic configuration of the advertisement processing server 2 according to this embodiment. As illustrated in FIG. 3A, the advertisement processing server 2 includes a communication unit 21, a storage unit 22 (an example of a storing means), an input/output interface unit 23, and a system control unit 24. The system control unit 24 and the input/output interface unit 23 are connected through a system bus 25. The communication unit 21 is connected to the network NW and controls the communication state.

The storage unit 22, for example, is configured by a hard disk drive or the like and stores various programs such as an operating system and an advertisement providing process program (including an information processing program according to the present invention). In addition, the advertisement providing process program, for example, may be downloaded from a predetermined server or the like through the network NW or may be recorded (recorded to be readable by using a computer) on a recording medium such as a compact disc (CD) or a digital versatile disc (DVD) and be read. Furthermore, in the storage unit 22, for example, an advertisement (advertisement data) provided from an advertiser is stored in association with an advertisement ID (an advertisement ID of the advertisement) identifying the advertisement.

In addition, in the storage unit 22, an advertisement database (DB) 221 and the like are arranged. Here, such databases may be configured not to be arranged in the storage unit 22 but to be arranged in a server other than the advertisement processing server 2. In the advertisement database 221, an advertisement ID of an advertisement, an advertiser ID (an advertiser ID of an advertiser) identifying an advertiser, a bid amount of the advertisement, and commodity information of a commodity that is an advertisement target are registered in association with each other. Here, the bid amount of an advertisement represents an amount designated by the advertiser for displaying the advertisement in an advertisement display area. In a case where the number of advertisement requests from advertisers is more than the number of advertisement display areas, as the bid amount of an advertisement is higher, the advertisement may be determined more easily as an advertisement to be displayed in a corresponding advertisement display area. In addition, in the commodity information of a commodity that is an advertisement target, a commodity ID (a commodity ID of a commodity) identifying a commodity and a commodity classification, attributes, attribute values, and the like of the commodity are included in association with each other. Here, the commodity ID is an example of commodity specifying information that uniquely specifies a commodity. The commodity specifying information may be information other than the commodity ID (for example, a commodity code or the like) as long as the information can be used for uniquely specifying a commodity. The commodity classification of a commodity, for example, represents a category of the commodity. As examples of the commodity classification, there are "camera", "television set", "washer", "refrigerator", and the like. In addition, the commodity classification may be configured to be classified into a plurality of hierarchies from a higher hierarchy (higher level) to a lower hierarchy (lower level). The attribute of a commodity, for example, represents performance (property), a price range, and the like of a commodity. For example, as examples of the attributes of the commodity classification "camera", there are pixels, zoom, a weight, a price range, and the like.

Furthermore, in the attribute of a commodity, a manufacturer of the commodity may be included. The attribute value of each attribute represents a specific value of the attribute or the like. For example, as examples of the attribute value of the attribute "pixels", there are 8 million, 10 million, and the like.

The system control unit 24 is configured by a central processing unit (CPU) 24*a*, a read only memory (ROM) 24*b*, a random access memory (RAM) 24*c*, and the like. FIG. 3B is a diagram that illustrates an example of functional blocks of the system control unit 54. The system control unit 24 as a computer executes an advertisement providing process according to the advertisement providing process program stored in the storage unit 22. In such an advertisement providing process, the system control unit 24, as illustrated in FIG. 3B, serves as an article acquiring unit 241, a commodity specifying unit 242, an evaluation deciding unit 243, a display target candidate selecting unit 244, a display target advertisement determining unit 245, an advertisement display control unit 246, and the like. The article acquiring unit 241 is an example of an acquiring means according to the present invention. The commodity specifying unit 242 is an example of a specifying means according to the present invention. The evaluation deciding unit 243 is an example of a deciding means according to the present invention. The display target advertisement determining unit 245 is an example of a determining means according to the present invention. The advertisement display control unit 246 is an example of a controlling means according to the present invention.

The article acquiring unit 241 acquires articles of a web page on which the article display areas and the advertisement display areas described above are arranged, for example, from the terminal Tn that displays the web page. The articles acquired here are articles registered by the page supervisor of the web page. In addition, for example, the number of advertisement display areas arranged on the web page may be configured to be acquired together with the articles.

The commodity specifying unit 242 specifies a commodity classification of a commodity and an attribute value of an attribute of the commodity belonging to the commodity classification based on the article acquired by the article acquiring unit 241. For example, the commodity specifying unit 242 specifies a commodity classification, which matches the commodity classification registered in a commodity classification list prepared in advance, from an article and specifies an attribute, which matches the attribute registered in an attribute list prepared in advance, from the article. Then, the commodity specifying unit 242 specifies an attribute value (for example, eight million pixels) that is associated (for example, described before or after a character representing the attribute) with the attribute (for example, the pixels) in the article. Meanwhile, there are cases where the commodity classification and the attribute value cannot be specified due to no inclusion of a commodity classification of a commodity and an attribute value of an attribute in the article, but a commodity ID of a commodity and an attribute of the commodity can be specified from the article by the commodity specifying unit 242, for example, by using a commodity ID list and an attribute list prepared in advance. In such cases, the commodity specifying unit 242 acquires a commodity ID of a commodity and an attribute of the commodity corresponding to the commodity ID list and the attribute list from the article and specifies a commodity classification that is registered in the advertisement database 221 in association with the acquired commodity ID and an attribute value that is an attribute value of the acquired attribute and is registered in the advertisement database 221 in association with the commodity ID.

The evaluation deciding unit 243 decides an evaluation made by the page supervisor for the attribute value specified by the commodity specifying unit 242 based on the article acquired by the article acquiring unit 241. For example, the evaluation deciding unit 243 specifies a word matching an evaluation word registered in an evaluation word list prepared in advance from the article and decides an evaluation (for example, attribute value→bad) based on the dependency relation between the specified word and the specified attribute (may be a related word of the attribute) or the attribute value. As an example of the related word of an attribute, in a case where the attribute is "pixels", "image quality" corresponds to the related word. Here, in evaluation words, positive words such as "good" or "slightness" and negative words such as "bad" or "seriousness" are included. In a case where the evaluation word is a positive word, the evaluation decided by the evaluation deciding unit 243 is positive. On the other hand, in a case where the evaluation word is negative, the evaluation decided by the evaluation deciding unit 243 is negative. In addition, since there are cases where the evaluation word is different for each attribute, an evaluation word may be registered for each attribute in the evaluation word list.

The display target candidate selecting unit 244 selects commodities which belong to the commodity classification specified by the commodity specifying unit 242 and of which attribute values of attributes of the commodities satisfy a selection condition according to the evaluation decided by the evaluation deciding unit 243 as display target candidates from commodities corresponding to the commodity information stored in the advertisement database 221. Here, the selection condition according to the evaluation is different between a case of a positive evaluation and a case of a negative evaluation. As the selection condition of the case of a positive evaluation, there is a condition of "having the same attribute value as the attribute value specified by the commodity specifying unit 242". In such a case, the display target candidate selecting unit 244 selects commodities having the same attribute value as the attribute value specified by the commodity specifying unit 242 as display target candidates. On the other hand, as a selection condition of the case of a negative evaluation, there is a condition of "having an attribute value that is more advantageous than the attribute value specified by the commodity specifying unit 242". In such a case, the display target candidate selecting unit 244 selects commodities having attribute values that are more advantageous than the attribute value specified by the commodity specifying unit 242 as display target candidates. Here, commodities (for example, commodities having good performance or the like) satisfying a demand of the page supervisor (poster) who has registered the article for an attribute value correspond to the commodities having advantageous attribute values.

The display target advertisement determining unit 245 determines commodities of advertisements to be displayed in the advertisement display areas of the web page from among the commodities selected as the display target candidates by the display target candidate selecting unit 244. For example, the display target advertisement determining unit 245 determines commodities corresponding to the number of advertisement display areas arranged on the web page. In addition, in a case where the number of selected display target candidates is more than the number of advertisement display areas, the display target advertisement determining unit 245, for example, determines display target candidates of higher bid amounts of advertisements or higher scores of advertisements as commodities of which advertisements are to be displayed in the advertisement display areas. Here, the score of an advertisement is calculated based on a keyword (for example, a classification of a commodity) included in the article acquired by the article acquiring unit 241. For example, as an advertisement includes more keywords, the score thereof is higher. In addition, the score of an advertisement may be calculated by using a technique that is used when a search result is sorted and displayed using a general search engine. In this embodiment, while the display target advertisement determining unit 245 is configured to determine commodities of which advertisements are to be displayed in the advertisement display areas from among the commodities selected by the display target candidate selecting unit 244 as the display target candidates, the display target advertisement determining unit 245 may be configured to determine commodities which belong to the commodity classification specified by the commodity specifying unit 242 and of which the attribute values of the attributes satisfy the condition according to the evaluation decided by the evaluation deciding unit 243 as commodities of which the advertisements are to be displayed in the advertisement display areas of the web page from the advertisement database 221. In such a case, the display target candidate selecting unit 244 may not be arranged.

The advertisement display control unit 246 provides (transmits) the advertisements of the commodities determined by the display target advertisement determining unit 245 to the web browser of the terminal Tn, thereby displaying the advertisements in the advertisement display areas of the web page.

In addition, the system control unit 24 has a function of receiving an advertisement bid through the terminal Tn of the advertiser and registering information relating to the bid advertisement in the advertisement database 221 in addition to the functions described above.

2. Operation of Information Providing System S

Figure 4:
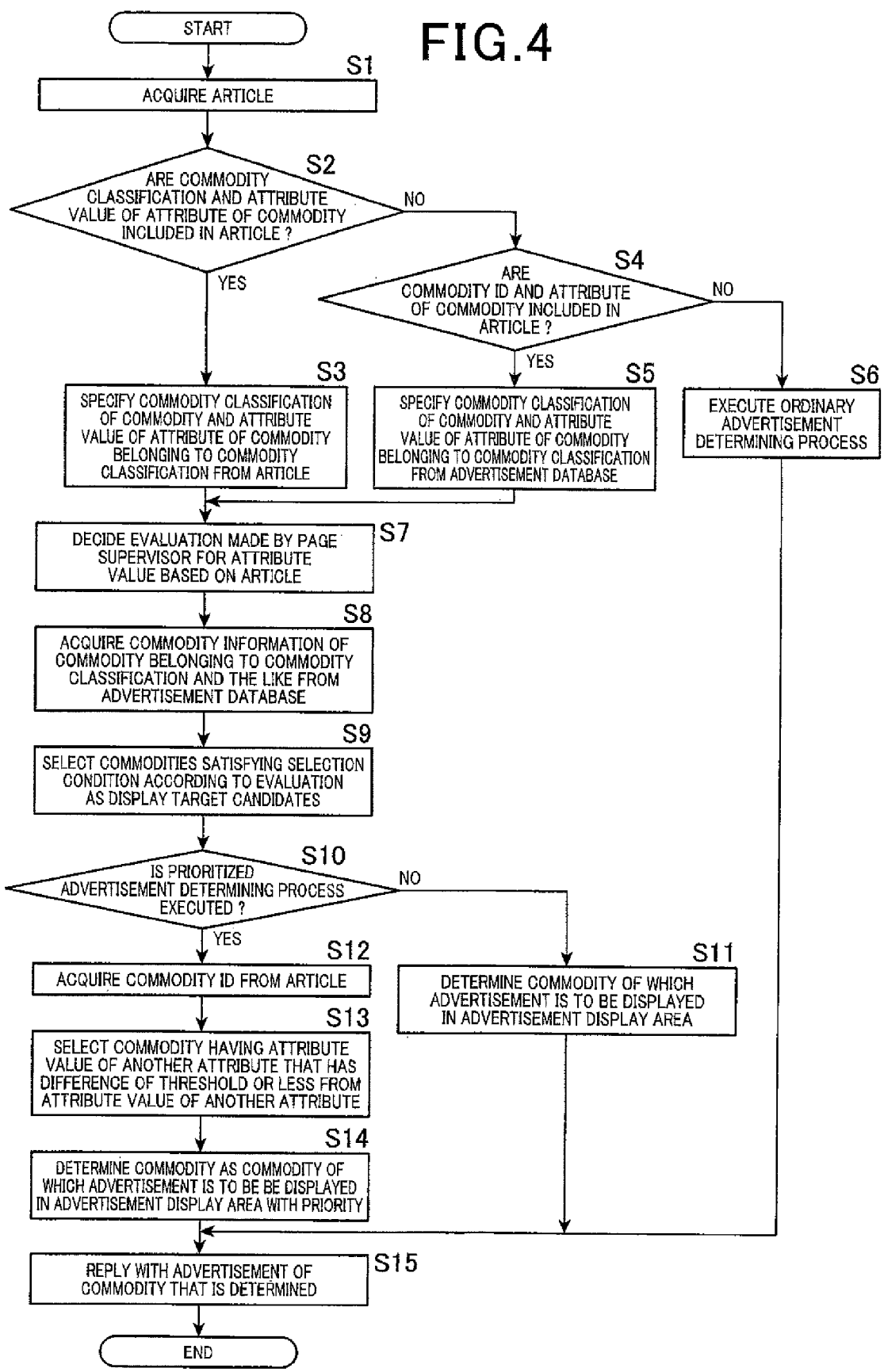
FIG. 4 is a flowchart that illustrates an example of an advertisement providing process executed by a system control unit 24 of the advertisement processing server 2.

Next, an example of the operation of the information providing system S according to this embodiment will be described with reference to FIG. 4. FIG. 4 is a flowchart that illustrates an example of the advertisement providing process executed by the system control unit 24 of the advertisement processing server 2. The process illustrated in FIG. 4, for example, is started in a case where the advertisement processing server 2 receives an advertisement distribution request transmitted from the terminal Tn through the network NW is received.

In addition, when a web page acquired from the information providing server 1 is displayed, the web browser of the terminal Tn executes a script embedded in the advertisement display areas of the web page, thereby acquiring articles described in predetermined article display areas. Then, the web browser accesses the advertisement processing server 2 through the network NW based on address information of the advertisement processing server 2 and transmits an advertisement distribution request including the article described above and the number of advertisement display areas of the web page to the advertisement processing server 2. In addition, in a case where a plurality of article display areas are arranged on the web page, articles described in all the article display areas and the registration date and time of the articles may be configured to be included in the advertisement distribution request. Alternatively, in such a case, an article (in other words, a latest article) described in the article display area associated with the latest registration date and time or an article described in the article display area that is in the active state may be configured to be included in the advertisement distribution request.

When the process illustrated in FIG. 4 is started, the article acquiring unit 241 of the system control unit 24 acquires the article and the number of advertisement display areas (hereinafter, referred to as an "advertisement display area number") from the received advertisement distribution request (step S1). For example, a latest article or an article described in the article display area that is in the active state is acquired from the advertisement distribution request. In addition, in a case where a plurality of articles are included in the advertisement distribution request, for example, an article associated with the latest registration date and time is acquired from among the plurality of articles. Alternatively, in such a case, an article including more commodity IDs may be configured to be acquired from among the plurality of articles.

Thereafter, the commodity specifying unit 242 of the system control unit 24 decides whether or not a commodity classification and an attribute value of an attribute of a commodity are included in the article acquired in step S1, for example, by using the commodity classification list and the attribute list described above (step S2). Then, in a case where the commodity classification and the attribute value of the attribute of the commodity are decided to be included in the article (Yes in step S2), the process proceeds to step S3. On the other hand, in a case where the commodity classification and the attribute value of the attribute of the commodity are decided not to be included in the article (No in step S2), the process proceeds to step S4.

In step S3, the commodity specifying unit 242 of the system control unit 24 specifies the commodity classification of the commodity and the attribute value of the attribute of the commodity belonging to the commodity classification from the article, and the process proceeds to step S7. For example, in a case where the acquired article is "the image quality of a camera with eight million pixels is bad", a commodity classification "camera", an attribute "pixels", and an attribute value "eight million pixels" are specified from the article.

In step S4, the commodity specifying unit 242 of the system control unit 24 decides whether or not a commodity ID and an attribute of a commodity are included in the article acquired in step S1, for example, by using the commodity ID list and the attribute list described above. Then, in a case where a commodity ID and an attribute of a commodity are decided to be included in the article (Yes in step S4), the process proceeds to step S5. On the other hand, in a case where a commodity ID and an attribute of a commodity are decided not to be included in the article (No in step S4), the process proceeds to step S6.

In step S5, the commodity specifying unit 242 of the system control unit 24 specifies a commodity classification of the commodity and an attribute value of an attribute of the commodity belonging to the commodity classification from the advertisement database 221, and the process proceeds to step S7. For example, in a case where the acquired article is "C01 has bad pixels", a commodity ID "C01" and an attribute "pixels" are acquired from the article. Then, a commodity classification "camera" that is registered in the advertisement database 221 in association with the acquired commodity ID "C01" and an attribute value "eight million pixels" that is an attribute value of the acquired attribute "pixels" and is registered in the advertisement database 221 in association with the commodity ID "C01" are specified. Accordingly, even in a case where a commodity classification and an attribute value of an attribute of a commodity are not included in the article, a commodity classification and an attribute value of an attribute can be specified based on the commodity ID and the attribute of the commodity.

In step S6, the system control unit 24 executes an ordinary advertisement determining process that is not based on an article. In this advertisement determining process, for example, high-rank commodities of high bid amounts of advertisements or high scores of advertisements are determined as commodities of which advertisements are to be displayed in the advertisement display areas, and the process proceeds to step S9.

In step S7, the evaluation deciding unit 243 of the system control unit 24 decides an evaluation made by the page supervisor for the attribute value specified in step S3 or S5 based on the article acquired in step S1, and the process proceeds to step S8. This decision process, for example, is executed by using the evaluation word list described above. In a case where the acquired article is "the image quality of a camera with eight million pixels is bad", an evaluation made by the page supervisor for the attribute value is decided as "eight million pixels→bad". On the other hand, in a case where the acquired article is "the image quality of a camera with ten million pixels is good", an evaluation made by the page supervisor for the attribute value is decided as "ten million pixels→good".

In step S8, the display target candidate selecting unit 244 of the system control unit 24 acquires commodity information and the like of commodities belonging to the commodity classification specified in step S3 or S5 from the advertisement database 221, and the process proceeds to step S9. FIG. 5A is a diagram that illustrates an example of a list of commodity information of commodities and the like acquired from an advertisement database 221 by the display target candidate selecting unit 244. In the list illustrated in FIG. 5A, in addition to a commodity ID, a commodity classification, and attribute values of attributes, an advertisement ID, a score of an advertisement, and a display rank are represented. In the example illustrated in FIG. 5A, while the display rank is in order of highest to lowest score of the advertisement, the display rank may be in order of highest to lowest bid amount of the advertisement.

In step S9, the display target candidate selecting unit 244 of the system control unit 24 selects (for example, by extracting commodity IDs, selects) commodities satisfying the selection condition according to the evaluation decided in step S7 from among commodities corresponding to the commodity information acquired in step S8 as display target candidates, and the process proceeds to step S10. For example, in a case where the evaluation is negative as "eight million pixels→bad", as described above, the display target candidate selecting unit 244 selects commodities having attribute values that are more advantageous than the attribute value specified in step S3 or S5 as display target candidates. FIG. 5B is a diagram that illustrates display target candidates selected in a case where an evaluation is negative. In the example illustrated in FIG. 5B, commodities (commodities having advantageous attribute values) having pixels more than the attribute value "eight million pixels" of which the evaluation is decided to be bad are selected as display target candidates. On the other hand, for example, in a case where the evaluation is positive as "ten million pixels→good", as described above, the display target candidate selecting unit 244 selects commodities having the same attribute value as the attribute value specified in step S3 or S5 as display target candidates. Even in the case where the evaluation is positive, the display target candidate selecting unit 244 may be configured to select commodities having attribute values that are more advantageous than the attribute value specified in step S3 or S5 as display target candidates.

In step S10, the system control unit 24 decides whether or not a prioritized advertisement determining process is executed. For example, in a case where a commodity ID is included in the article acquired in step S1, the prioritized advertisement determining process is decided to be executed. Then, in a case where the prioritized advertisement determining process is determined to be executed (Yes in step S10), the prioritized advertisement determining process is started, and the process proceeds to step S12. On the other hand, in a case where the prioritized advertisement determining process is decided not to be executed (No in step S10), the process proceeds to step S11. In addition, for example, the prioritized advertisement determining process may be configured to be locked by an operator who operates the advertisement processing server 2 and provides advertisements or the like.

In step S11, the display target advertisement determining unit 245 of the system control unit 24 determines commodities of which advertisements are to be displayed in the advertisement display areas of the web page of an advertisement distribution request source from among the commodities selected as the display target candidates in step S9, and the process proceeds to step S15. For example, the display target advertisement determining unit 245, for example, based on the display ranks (for example, in order of the score) illustrated in FIGS. 5A and 5B, determines high-rank commodities of high display ranks from among the commodities selected as the display target candidates (corresponding to the advertisement display area number acquired in step S1). In the case of the web page illustrated in FIG. 2, since three advertisement display areas 61 to 63 are arranged, three commodities (in the example illustrated in FIG. 5B, commodities of which commodity IDs are "C02", "N01", and "N02") are determined as commodities of which advertisements are to be displayed in the advertisement display areas.

In step S12, the commodity specifying unit 242 of the system control unit 24 acquires a commodity ID from the article acquired in step S1. Next, the commodity specifying unit 242 of the system control unit 24 specifies an attribute value of an attribute that is other than the attribute value specified in step S3 or S5 described above and is registered in the advertisement database 221 in association with the commodity ID acquired in step S12 (step S13). For example, in a case where the attribute value specified in step S3 or S5 described above is "pixels", an attribute value "20,000 Yen to 39,999 Yen" of the other attribute "price range" associated with the commodity ID "C01" is specified.

Next, the display target advertisement determining unit 245 of the system control unit 24 determines a commodity (hereinafter, referred to as a "prioritized commodity") having an attribute value of the other attribute having a difference from the attribute value of the other attribute specified in step S13 to be a threshold or less among the display target candidates selected in step S9 as a commodity of which the advertisement is to be displayed in the advertisement display area of the web page of the advertisement distribution request source with priority (step S14). For example, the display target advertisement determining unit 245 rearranges the display rank such that the display rank of the prioritized commodity is highly ranked and then, determines high-rank commodities of which the display ranks are high (corresponding to the advertisement display area number acquired in step S1). Here, "a difference from the attribute value of the other attribute being a threshold or less" represents that the attribute values of the other attributes are the same or close to each other. FIG. 6 is a diagram that illustrates the manner of rearrangement of display ranks of display target candidates. In the example illustrated in FIG. 6, a commodity (a commodity of which the commodity ID is "N03") of which the attribute value is the same as that of a commodity ID "C01" is prioritized the most, and the display rank thereof is changed to the highest rank. In addition, for example, in a case where there are a plurality of commodities of which the attribute values are the same as that of the commodity ID "C01", the display ranks of such commodities may be configured to be based on the original display ranks (for example, in order of scores). In addition, the "attribute value of the other attribute", for example, may be an attribute value of the zoom or an attribute value of the weight other than the attribute value of the price range.

In addition, for example, particularly, in a case where a term ("only", "limit", or the like) limiting the attribute is included in the article, and the evaluation is negative as in a case where the acquired article is "only pixels of C01 are bad", in step S13 described above, the commodity specifying unit 242 is preferably configured to specify a plurality of attribute values of other attributes registered in the advertisement database 221 in association with the commodity ID. In such a case, for example, in a case where the attribute value specified in step S3 or S5 described above is "pixels", an attribute value "ten times" of another attribute "zoom", an attribute value "500 g" of another attribute "weight", and an attribute value "20,000 Yen to 39,999 Yen" of another attribute "price range", which are associated with the commodity ID "C01" are specified. Then, in step S14, the display target advertisement determining unit 245 determines a prioritized commodity having attribute values of a plurality of the other attributes having differences from the attribute values of the plurality of the other attributes specified in step S13 to be a threshold or less is determined from among the display target candidates selected in step S9. Here, each of the "differences from the attribute values of the other attributes" is calculated as a distance (closeness between attribute values) for the attribute value of each of the other attributes. For example, in a case where the attribute values are the same, the distance is "0". Then, a total of the distances calculated for the attribute values of the other attributes is calculated, and, a commodity of which the total distance is smaller is determined with higher priority. FIG. 7 is a diagram that illustrates the manner of rearrangement of display ranks of display target candidates based on a total of distances according to differences of attribute values of a plurality of other attributes. In the example illustrated in FIG. 7, a commodity (a commodity of which the commodity ID is "N03") having a shortest (a value relating to the distance is the smallest) total distance is prioritized the most, and the display rank thereof is changed to the highest rank.

Then, in step S15, the advertisement display control unit 246 of the system control unit 24 replies with (transmits) the advertisement (advertisement data) of the commodity determined in step S6, S11, or S14 to the web browser of the terminal Tn, thereby displaying the advertisement in the advertisement display area. In addition, in a case where a plurality of advertisements are determined in step S6, S11, or S14, each advertisement and information representing the display rank of the advertisement may be configured to be transmitted to the web browser of the terminal Tn. In this way, when the advertisement of the commodity is acquired, the web browser of the terminal Tn displays the advertisement in the advertisement display area of the web page. In addition, in a case where a plurality of advertisements and information representing the display rank of each advertisement are acquired, the web browser of the terminal Tn displays the advertisements in the advertisement display areas according to the display rank. For example, as the display rank of an advertisement is higher, the advertisement is displayed in the advertisement display area (the advertisement display area 61 in the example illustrated in FIG. 2) arranged on the upper part of the web page.

As described above, according to the embodiment described above, in a case where an advertisement distribution request is received from the terminal Tn, the advertisement processing server 2 specifies a commodity classification of the commodity and attribute values of attributes of commodities belonging to the commodity classification based on the article described on the web page displayed on the terminal Tn and decides the evaluation made by the page supervisor for the attribute value based on the article. Then, the advertisement processing server 2 is configured to select commodities that belong to the specified commodity classification and satisfy the selection condition according to the decided evaluation as display target candidates and determines commodities of which the advertisements are to be displayed in the advertisement display areas of the web page from among the selected commodities, and accordingly, advertisements according to the intention of the page supervisor who is a person registering the article can be determined as advertisements to be displayed on the web page.

In addition, in a case where a latest article is acquired from the advertisement distribution request, since the advertisement processing server 2 specifies a commodity classification of a commodity and attribute values of attributes of commodities belonging to the commodity classification based on the latest article, decides evaluations made by the page supervisor for the attribute values based on the article, and determines commodities of which advertisements are to be displayed in the advertisement display areas as described above, advertisements according to the latest intention of the page supervisor can be determined as advertisements to be displayed on the web page.

Furthermore, in a case where an article described in the article display area that is in the active state is acquired from the advertisement distribution request, since the advertisement processing server 2 specifies a commodity classification of a commodity and attribute values of attributes of commodities belonging to the commodity classification based on the article described in the article display area that is in the active state, decides evaluations made by the page supervisor for the attribute values based on the article, and determines commodities of which advertisements are to be displayed in the advertisement display areas as described above, advertisements according to the intention of the page supervisor and the article that is currently read by a reader can be determined as advertisements to be displayed on the web page.

In addition, according to the configuration in which a prioritized commodity having an attribute value of another attribute that has a difference of a threshold or less from the attribute value of the attribute is determined with high priority as a commodity of which the advertisement is displayed in the advertisement display area from among the selected display target candidates, advertisements displayed on the web page can be configured to further follow the intention of the page supervisor who is a person registering the article.

3. Other Embodiments

In the embodiment described above, as illustrated in FIG. 2, while a configuration has been described in which the article display areas 51 to 53 and the advertisement display areas 61 to 63 are displayed (for example, scroll display) on the display screen D in a movable manner, it may be configured such that that article display areas 51 to 53 are displayed on the display screen D in a movable manner, and the advertisement display areas 61 to 63 are displayed on the display screen D in a fixed manner. Here, in a state in which the advertisement display areas 61 to 63 are displayed in a fixed manner, the advertisement display areas are constantly in the active state during the display of the web page unless another window screen is superimposed on the advertisement display areas 61 to 63. In the case of such a web page, the advertisement display control unit 246 of the advertisement processing server 2 may be configured to switch advertisements displayed in the advertisement display areas to the web browser of the terminal Tn in accordance with movement (for example, scrolling) of the article display areas.

Figure 8A:
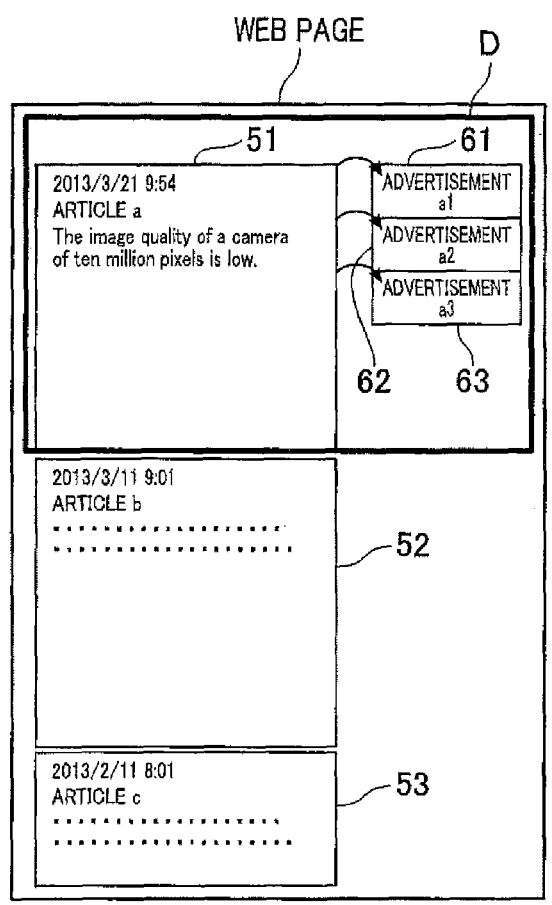
FIGS. 8A and 8B are diagrams that illustrate the manners of switching between advertisements displayed in advertisement display areas according to the movement (for example, scrolling) of an article display area.
Figure 8B:
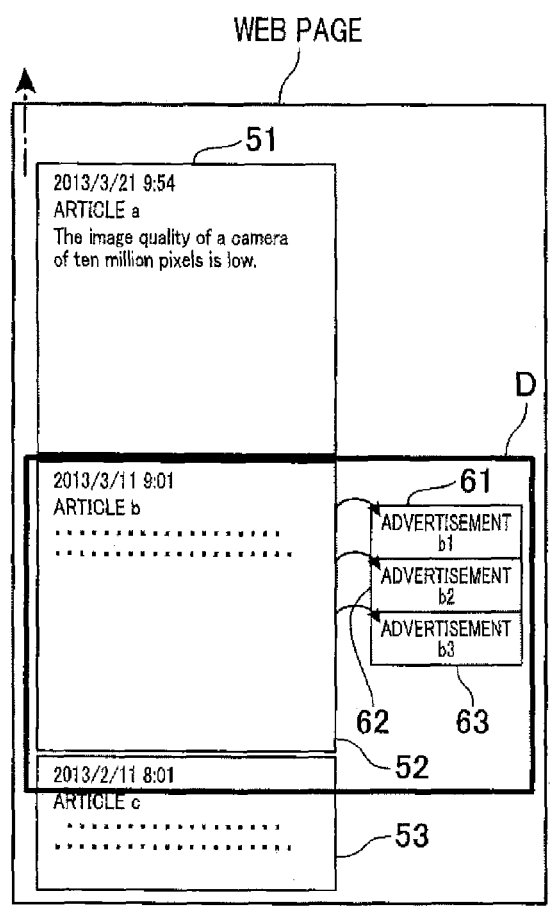

FIGS. 8A and 8B are diagrams that illustrate the manners of switching between advertisements displayed in advertisement display areas according to the movement (for example, scrolling) of an article display area. In the example illustrated in FIGS. 8A and 8B, a right half area including the advertisement display areas 61 to 63 are in a fixed display state. For example, as illustrated in FIG. 8A, when the article display area 51 is in the active state, advertisements a1 to a3 of commodities determined by the process illustrated in FIG. 4 based on an article a described in the article display area 51 are displayed in the advertisement display areas 61 to 63. Then, as illustrated in FIG. 8B, when the article display area 52 is in the active state in accordance with movement (for example, scrolling) of the article display area, switching is executed such that advertisements b1 to b3 of commodities determined by the process illustrated in FIG. 4 are displayed in the advertisement display areas 61 to 63 based on the article b described in the article display area 52. Such advertisement display switching control may be configured to be executed by the advertisement display control unit 246 in accordance with movement (for example, scrolling) of the article display area in real time. However, in order to reduce a system load or a time lag, it is preferable that the advertisement display control unit 246 is configured to acquire articles a to c described in the article display areas 51 to 53 in advance, determine commodities for each of the articles a to c by executing the process illustrated in FIG. 4 based on the articles, and transmit a script defining the advertisement display switching control to the web browser of the terminal Tn together with advertisements of the commodities. Accordingly, the advertisement display control unit 246 switches the advertisements displayed in the advertisement display areas to the web browser. According to such a configuration, appropriate advertisements can be displayed following a reader's reading operation accompanying scrolling.

In addition, the advertisement display control unit 246 may be configured to switch the advertisements displayed in the advertisement display areas to the web browser of the terminal Tn based on a change in the display ratio "the area of a display portion of the article display area/entire article display area" of the article display area, which is in the active state, to the entire article display area. In addition, instead of the display ratio of the display portion of the inside of the article display area to the entire article display area, a display ratio "the area of the display portion of the article display area/the area of the entire display screen" of the article display area to the display screen D may be used. Here, the display ratio of the article display area to the display screen D also includes a display ratio "the area of the display portion of the article display area/(the area of the entire display screen—the entire fixed display area)" to a portion acquired by excluding the fixed display area including the advertisement display areas from the display screen D. In addition, the display ratio of the article display area to the display screen D also includes a display ratio "the area of the display portion of the article display area/(the area of the entire display screen—the area of a portion other than the article display area)" to a portion acquired by excluding a portion other than the article display area from the display screen D.

Figure 9A:
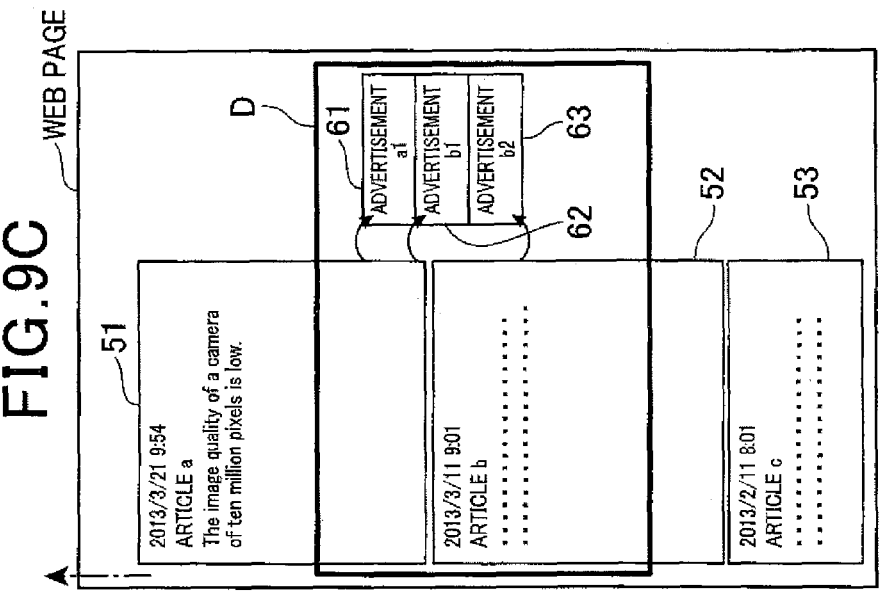
FIGS. 9A to 9C are diagrams that illustrate the manners of switching between advertisements displayed in an advertisement display area according to a change in the display ratio of an article display area to a display screen.
Figure 9B:
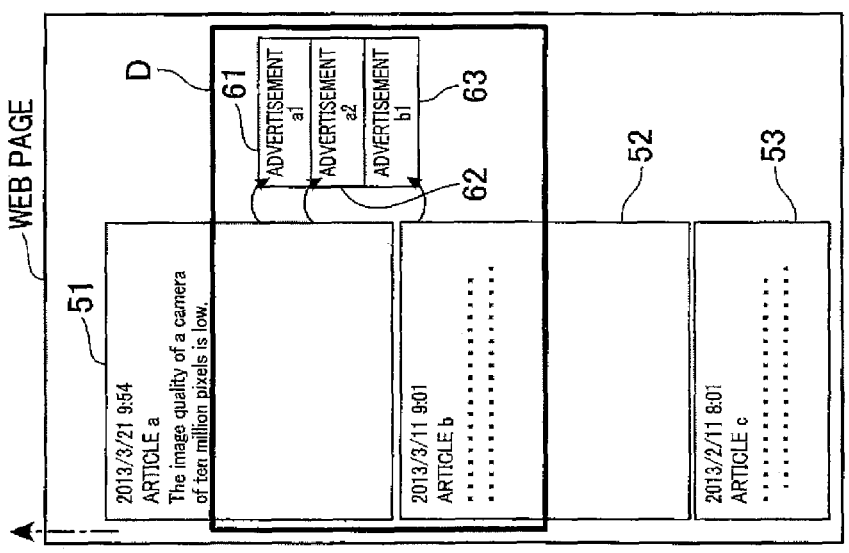
Figure 9C:
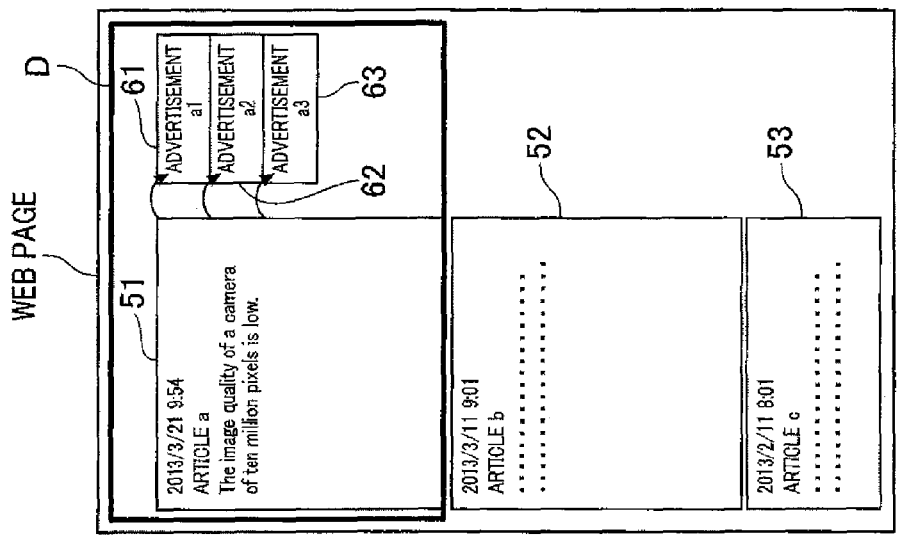

FIGS. 9A to 9C are diagrams that illustrate the manners of switching between advertisements displayed in an advertisement display area according to a change in the display ratio of a display portion of the inside of the article display area to the entire article display area. For example, as illustrated in FIG. 9A, when the display ratio of the display portion of the inside of the article display area 51 to the entire article display area 51 is "66% or more and 100% or less", the advertisements a1 to a3 of the commodities determined by the process illustrated in FIG. 4 based on the article a described in the article display area 51 are displayed in the advertisement display areas 61 to 63. Then, according to the movement (for example, scrolling) of the article display area, as illustrated in FIG. 9B, when the display ratio of the display portion of the inside of the article display area 51 to the entire article display area 51 is "33% or more and less than 66%", the advertisements a1 and a2 of the commodities determined by the process illustrated in FIG. 4 based on the article a described in the article display area 51 are switched to be displayed in the advertisement display areas 61 and 62 but not in the advertisement display area 63. In other words, in such a case, in the advertisement display area 63, the advertisement b1 of the commodity determined by the process illustrated in FIG. 4 based on the article b described in the article display area 52 is switched to be displayed. Furthermore, as illustrated in FIG. 9C, when the display ratio of the display portion of the inside of the article display area 51 to the entire article display area 51 is "more than 0% and less than 33%", the advertisement a1 of the commodity determined by the process illustrated in FIG. 4 based on the article a described in the article display area 51 is switched to be displayed only in the advertisement display area 61. In this way, the advertisement display control unit 246 switches an advertisement displayed in the advertisement display area of a ratio according to the display ratio out of a plurality of advertisement display areas to the web browser of the terminal Tn. According to such a configuration, appropriate advertisements can be displayed further following a reader's reading operation accompanying scrolling. Even in the case of such a configuration, it is preferable that the advertisement display control unit 246 is configured to acquire articles a to c described in the article display areas 51 to 53 in advance, determine commodities for each of the articles a to c by executing the process illustrated in FIG. 4 based on the articles a to c, and transmit a script defining the advertisement display switching control according to the display ratio to the web browser of the terminal Tn together with advertisements of the commodities. Accordingly, the advertisement display control unit 246 switches the advertisements displayed in the advertisement display areas to the web browser.

In the embodiment described above, while the information providing server 1 and the advertisement processing server 2 are configured as independent hardware, the function of the information providing server 1 may be configured to be embedded in the advertisement processing server 2. In such a case, in a case where there is a request for a web page from the terminal Tn, the advertisement processing server 2 embeds advertisements of commodities determined by executing the process illustrated in FIG. 4 in the advertisement display areas and transmits a web page in which the advertisements are embedded to the terminal Tn.

REFERENCE SIGN LIST

1 Information providing server
2 Advertisement processing server
21 Communication unit
22 Storage unit
23 Input/output interface unit
24 System control unit
Tn Terminal
NW Network
S Information providing system

The invention claimed is:

1. A display controlling device comprising:
a database, the database configured to store a specified commodity classification of each of a plurality of commodities, and an attribute value for each of said plurality of commodities;
at least one memory operable to store computer program code;
at least one processor configured to access the computer program code and operate according to the computer program code, the computer program code including:
acquiring code configured to cause at least one of the at least one processor to acquire a first article on a web page that is transmitted from a server to a terminal device through a network, the web page being displayed on a display screen of the terminal device, the web page including article display areas for displaying the first article posted by a user, an advertisement display area for displaying a first advertisement of a first commodity associated with the first article, and a script for requesting the display controlling device to distribute the first advertisement, wherein the article display areas include a first article display area and a second article display area, wherein the first article display area and the second article display area are configured to be displayed on the display screen in a movable manner, and the advertisement display area is configured to be displayed on the display screen in a fixed manner;
specifying code configured to cause at least one of the at least one processor to specify, from the first article, a commodity classification of an input commodity and an attribute value of an attribute of the input commodity;
deciding code configured to cause at least one of the at least one processor to:
identify, from the first article, a word matching an evaluation word that is registered in a prepared evaluation word list that includes a positive evaluation word and a negative evaluation word; and
obtain a decided evaluation by deciding whether an evaluation of the attribute value is either positive or is negative from a dependency relation between the identified word and the attribute value that are specified;
determining code configured to cause at least one of the at least one processor to:
compare the specified attribute value of the input commodity and an attribute value of at least one commodity of the plurality of commodities in the database, the at least one commodity matching the specified commodity classification of the input commodity,
determine, in response to the decided evaluation being positive, the at least one commodity corresponding to the attribute value that is the same as the specified attribute value, as the first commodity, and
determine, in response to the decided evaluation being negative, the at least one commodity corresponding to the attribute value that is greater than the specified attribute value, as the first commodity, and
wherein the computer program code is further configured to apply the acquiring code, the specifying code, the deciding code, and the determining code with respect to a second article,
wherein the script is configured to cause the terminal device to:
detect, as an active state, that the article display area is displayed on the display screen of the terminal device,
request and acquire the first advertisement from the display control device,
display the first advertisement in the advertisement display area of the web page on the display screen of the terminal device and
wherein when the article display area is in the active state in accordance with a scrolling of the article display areas, the script is configured to cause:
a determination of a display area ratio, wherein the display area ratio depends on a ratio of a display portion of the first article display area to an entire article display area, wherein, as the scrolling is happening and according to the movement of the first article display area, the display area ratio is caused to change and a switching is caused, wherein the switching is based on the display area ratio such that the first advertisement is replaced with a second advertisement of a second commodity associated with the second article, wherein the second commodity is associated with the second article.

2. The display controlling device according to claim 1, wherein the specifying code causes at least one of the at least one processor to further:
acquire, from the first article, commodity specifying information of the input commodity and the attribute of the input commodity from the first article; and
specify the commodity classification that is stored in a storage and corresponds to the acquired commodity specifying information, and the attribute value that corresponds to the acquired attribute and is stored in the storage.

3. The display controlling device according to claim 2, wherein the specifying code causes at least one of the at least one processor to further specify another attribute value of another attribute other than the specified attribute value, the other attribute being stored in the storage and corresponding to the acquired commodity specifying information, and
the determining code causes at least one of the at least one processor to further determine one or more commodities corresponding to one or more attribute values of one more attributes having a difference of a threshold or less from the specified other attribute value, as the first commodity of which the first advertisement is to be displayed.

4. The display controlling device according to claim 1, wherein the determining code causes at least one of the at least one processor to further, in response to the evaluation being decided to be positive, determine, from the database, the at least one commodity corresponding to the at least one attribute value that is same as the specified attribute value, as the first commodity of which the first advertisement is to be displayed.

5. The display controlling device according to claim 1, wherein the determining code causes at least one of the at least one processor to further, in response to the evaluation being decided to be negative, determine, from the database, the at least one commodity corresponding to the at least one attribute value that is more advantageous than the specified attribute value, as the first commodity of which the first advertisement is to be displayed.

6. The display controlling device according to claim 1, wherein a plurality of the article display areas are arranged on the web page, each of the plurality of article display areas being associated with a registration date and a registration time of a respective one of a plurality of articles, and
the acquired article is one of the plurality of articles with a latest registration date and a latest registration time.

7. The display controlling device according to claim 1, wherein a plurality of the article display areas are arranged on the web page, each of the plurality of the article display areas being switchable between an active state and an inactive state on the display screen, and
the first article is displayed in one of the plurality of article display areas that is in the active state.

8. The display controlling device according to claim 1, wherein the controlling code causes at least one of said at least one processor to switch the advertisement displayed in the advertisement display area, based on a change in the display area ratio of the article display area that is in the active state to an entirety of the article display area.

9. A display controlling method that is executed by a computer, the method comprising:
A) acquiring a first article on a web page that is transmitted from a server to a terminal device through a network, the web page being displayed on a display screen of the terminal device, the web page including article display areas for displaying the first article posted by a user, an advertisement display area for displaying a first advertisement of a first commodity associated with the first article, and a script for requesting the display controlling device to distribute the first advertisement, wherein the article display areas include a first article display area and a second article display area, wherein the first article display area and the second article display area are configured to be displayed on the display screen in a movable manner, and the advertisement display area is configured to be displayed on the display screen in a fixed manner;
B) specifying, from the first article, a commodity classification of an input commodity and an attribute value of an attribute of the input commodity;
C) identifying, from the first article, a word matching an evaluation word that is registered in a prepared evaluation word list that includes a positive evaluation word and a negative evaluation word;
D) obtaining a decided evaluation by deciding whether an evaluation of the attribute value is either positive or is negative from a dependency relation between the identified word and the attribute value that are specified;
E) comparing the specified attribute value of the input commodity and an attribute value of at least one commodity of the plurality of commodities in a database, the database configured to store a specified commodity classification of each of a plurality of commodities, and an attribute value for each of said plurality of commodities, the at least one commodity matching the specified commodity classification of the input commodity;
F) determining, in response to the decided evaluation being positive, the at least one commodity corresponding to the attribute value that is the same as the specified attribute value, as the first commodity; and
G) determining, in response to the decided evaluation being negative, the at least one commodity corresponding to the attribute value that is greater than the specified attribute value, as the first commodity,
wherein the display controlling method further comprises performing: A) applying, B) specifying, C) identifying, D) obtaining, E) comparing, F) determining, and G) determining with respect to the second article,
wherein the script is configured to cause the terminal device to request and acquire the first advertisement from the display control device and display the first advertisement in the advertisement display area of the web page on the display screen of the terminal device and detect, as an active state, that the article display area is displayed on the display screen of the terminal device, wherein when the article display area is in the active state in accordance with a scrolling of the article display areas, the script is configured to cause:
a determination of a display area ratio, wherein the display area ratio depends on a ratio of a display portion of the first article display area to an entire article display area, wherein, as the scrolling is happening and according to the movement of the first article display area, the display area ratio is caused to change and a switching is caused, wherein the switching is based on the display area ratio such that the first advertisement is replaced with a second advertisement of a second commodity associated with the second article, wherein the second commodity is associated with the second article.

10. The information processing device according to claim 1, wherein the evaluation word list includes the positive evaluation word and the negative evaluation word for each attribute, and
wherein the deciding code identifies, from the acquired article, the word matching the evaluation word registered in the evaluation word list in association with the attribute of the specified commodity.

11. The display controlling device of claim 1, wherein the script is further configured to cause obtaining, from the display controlling device, the second advertisement associated with the second commodity in accordance with the scrolling of the article display areas in real time.

12. The display controlling device of claim 1, wherein the second advertisement transmitted to the terminal device is determined in advance by:
acquiring the second article;
determining the second commodity for the second article; and
determining the second advertisement, thereby permitting an appropriate advertisement to be displayed following a reader's reading operation accompanying scrolling, and avoiding a system load.

13. The display controlling device of claim 1, wherein the web page includes a plurality of advertisement display areas,
- at a first time, a first plurality of advertisements corresponding to the first article are displayed in the plurality of advertisement display areas,
- at a second time, a change of the display area ratio of the first article to a changed display area ratio occurs due to the scrolling of the article display areas, and
- at a third time and based on the changed display area ratio, at least one advertisement out of the first plurality of advertisements corresponding to the first article is switched to the second advertisement corresponding to the second article.

\* \* \* \* \*